(12) United States Patent
Jethwa et al.

(10) Patent No.: US 11,930,226 B2
(45) Date of Patent: Mar. 12, 2024

(54) EMOTION EVALUATION OF CONTENTS (71) Applicant: Roku, Inc., San Jose, CA (US)

(72) Inventors: Ronica Jethwa, Mountain View, CA (US); Nam Vo, San Jose, CA (US); Fei Xiao, San Jose, CA (US); Abhishek Bambha, Burlingame, CA (US)

(73) Assignee: Roku, Inc., San Jose, CA (US)

(*) Notice: Subject to any disclaimer, the term of this patent is extended or adjusted under 35 U.S.C. 154(b) by 0 days.

(21) Appl. No.: 17/877,124

(22) Filed: Jul. 29, 2022

(65) Prior Publication Data

US 2024/0040165 A1 Feb. 1, 2024

(51) Int. Cl.
*H04N 21/234* (2011.01)
*G06V 20/40* (2022.01)
*H04N 21/25* (2011.01)
*H04N 21/81* (2011.01)
*H04N 21/8549* (2011.01)

(52) U.S. Cl.
CPC ....... *H04N 21/23418* (2013.01); *G06V 20/41* (2022.01); *H04N 21/251* (2013.01); *H04N 21/812* (2013.01); *H04N 21/8549* (2013.01); *G06V 2201/10* (2022.01)

(58) Field of Classification Search
CPC ........... H04N 21/23418; H04N 21/251; H04N 21/812; H04N 21/8549
USPC .......................................................... 725/32
See application file for complete search history.

(56) References Cited

U.S. PATENT DOCUMENTS

| 2015/0213002 | A1* | 7/2015 | Gou ........................ G06F 40/30 704/9 |
| 2017/0052964 | A1* | 2/2017 | Hu ........................ G06F 16/739 |
| 2018/0324491 | A1* | 11/2018 | Anderson ............. H04L 9/3231 |
| 2018/0349386 | A1* | 12/2018 | Circlaeys ................ G06F 16/44 |
| 2019/0373330 | A1* | 12/2019 | Bloch ................ H04N 21/4532 |
| 2020/0005046 | A1* | 1/2020 | Attorre ................. G06T 7/0002 |
| 2020/0074229 | A1* | 3/2020 | AlShikh .................. G06F 40/30 |
| 2020/0288206 | A1* | 9/2020 | Bist ..................... H04N 21/4756 |
| 2020/0296480 | A1* | 9/2020 | Chappell, III ..... H04N 21/8545 |

(Continued)

FOREIGN PATENT DOCUMENTS

| CN | 107578807 A | * | 1/2018 | |
| CN | 112699785 A | * | 4/2021 | ......... G06K 9/00302 |

OTHER PUBLICATIONS

S. Arifin and P. Y. K. Cheung, "Affective Level Video Segmentation by Utilizing the Pleasure-Arousal-Dominance Information," in IEEE Transactions on Multimedia, vol. 10, No. 7, pp. 1325-1341, Nov. 2008, doi: 10.1109/TMM.2008.2004911. (Year: 2008).*

*Primary Examiner* — Cynthia M Fogg
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for generating a scene emotion value for a scene based on a sequence of frame emotion values for a sequence of frames within the scene of a content. The content can include multiple scenes, and a scene can include multiple frames, where a frame emotion value can be generated for each frame. A frame emotion value can be generated based on scene metadata related to the scene, content metadata related to the content, and a frame metadata related to the frame.

20 Claims, 6 Drawing Sheets

(56) References Cited

U.S. PATENT DOCUMENTS

| | | | |
|---|---|---|---|
| 2020/0387934 A1* | 12/2020 | M V | G06Q 30/0271 |
| 2021/0044870 A1* | 2/2021 | Li | H04N 21/252 |
| 2021/0272599 A1* | 9/2021 | Patterson | G06N 3/045 |
| 2021/0352380 A1* | 11/2021 | Duncan | H04N 21/4852 |
| 2022/0020061 A1* | 1/2022 | Zavesky | G06Q 30/0267 |
| 2022/0132179 A1* | 4/2022 | Bennett-James | G06V 20/70 |

* cited by examiner

EMOTION EVALUATION OF CONTENTS

BACKGROUND

Field

This disclosure is generally directed to emotion evaluation of content such as media content of a media system based on an emotion model.

Background

Media content may include videos, movies, advertisement, audio files, text, etc., and any combination thereof. Media content may simply be referred to as content herein. Media content plays an essential role in society. With the exponential growth of media content, how to efficiently and accurately deliver the content to interested viewers, users, or audience can be of value to those parties as well as the content creators.

SUMMARY

Provided herein are system, apparatus, article of manufacture, method and/or computer program product embodiments, and/or combinations and sub-combinations thereof, for emotion evaluation of frames, scenes, content, advertisement, and users or viewers based on an emotion model. Accordingly, an advertisement can be displayed after a scene with a scene emotion value similar to an emotion value of the advertisement. A content can be recommended to a user when the content has a content emotion value similar to the emotion value of the user. A preview clip can be generated for a content including one or more scenes having scene emotion values similar to the content emotion value. In addition, a personalized preview clip can be generated for a content targeting a user, where the personalized preview clip can include a scene with a scene emotion value similar to an emotion value of the user.

An example embodiment of a method can include generating, based on an emotion model, a sequence of frame emotion values for a scene of a content corresponding to a sequence of frames of the scene. The content can include multiple scenes, and a scene can include multiple frames, where a frame emotion value can be generated for each frame. Accordingly, the sequence of frame emotion values for the scene can include a frame emotion value for each frame of the scene, and can include at least a first frame emotion value for a first frame of the scene and a second frame emotion value for a second frame of the scene. The first frame emotion value and the second frame emotion value can be generated based on scene metadata related to the scene, and content metadata related to the content. In addition, the first frame emotion value can be generated further based on a first frame metadata related to the first frame, and the second frame emotion value can be generated further based on a second frame metadata related to the second frame. In addition, the method further includes generating a scene emotion value for the scene based on the sequence of frame emotion values.

An example embodiment of a media system can include at least one controller configured to generate, based on an emotion model, a sequence of frame emotion values for a scene of a content corresponding to a sequence of frames of the scene, and generate a scene emotion value for the scene based on the sequence of frame emotion values.

An example embodiment of a non-transitory computer-readable medium can have instructions stored thereon that, when executed by at least one computing device, cause the computing device to perform various operations. The operations being performed can include generating, based on an emotion model, a sequence of frame emotion values for a scene of a content corresponding to a sequence of frames of the scene, and generating a scene emotion value for the scene based on the sequence of emotion values.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

With the technology advance for multimedia and communication, media content has grown exponentially. Compared to the early days when media content may be limited to printed publications or delivered by radio, current media content can be available in various forms such as videos, movies, advertisement, audio files, text, etc., and any combination thereof. In addition, media can be delivered via various communication technologies so that media content can be accessed, watched, or listened to anywhere and anytime. In general, media content may be referred to as content, which may include a plurality of scenes, where a scene can include a sequence of frames. How to efficiently and accurately deliver the content to interested viewers, users, or audience, can be of value to those parties as well as the content creators. Viewers, users, or audience (and similar parties and entities) are used interchangeably in the current description.

Traditionally, content such as a movie can be marketed by a poster, text description, or title. For a large content such as a movie that may last more than an hour, a trailer or a preview clip of the movie, which may last a much shorter time than the movie itself, e. g., one minute, may be used to market the movie and inform the potential audience of the likely content of the movie. A trailer or a preview clip of the content can provide more information about the content than a poster, text description, or title, hence helping the user to make a better informed decision on whether to watch the content or not.

However, currently, preview clips may be manually generated by the content creators. The content creators may create a single preview clip or trailer for the content, which may be shown to all audience without being personalized. In addition, current preview clips do not consider emotion understanding of the contents. In real life, users may watch a preview clip or trailer of a content with an expectation of emotional connection. For example, a user may watch a preview clip of a comedy content with an expectation of being amused, and expect to see comedy related scenes in the preview clip. Similarly, a user may watch a preview clip for a thriller movie with the expectation to be surprised, curious, and have their hearts pumping.

Embodiments herein present techniques and mechanisms to measure the emotion aspect of a content so that, for example, the content can be better marketed to the right audience with similar emotions. A content can include a plurality of scenes, where a scene can further include a plurality of frames. Embodiments herein can generate a frame emotion value for a frame, a scene emotion value for a scene, and a content emotion value for a content based on an emotion model. Furthermore, a preview clip can be generated to include a scene with a scene emotion value similar or close to the content emotion value of the content. Hence, the preview clip generated by considering the emotion values can be more meaningful and attractive for user engagement than preview clips generated without considering the emotion part of the content.

In addition, a personalized preview clip can be generated for a content targeting users with similar emotion values. For a given content, not all users will have the same expectation of emotion from that content. Some users may expect to see a combination of comedy and light scenes together with some horror scenes to be convinced to watch a content. On the other hand, some other users may prefer to see only the main story plot with some generic intro or some horror scenes to be convinced. A personalized preview clip can include a scene with a scene emotion value closer to an emotion value of the user in comparison to other scenes not included in the personalized preview clip.

Additional applications can be developed based on a content emotion value or a scene emotion value. For example, an advertisement can be displayed after a scene with a scene emotion value similar to an emotion value of the advertisement. A content can be recommended to a user when the content has a content emotion value similar to the emotion value of the user.

Figure 1:
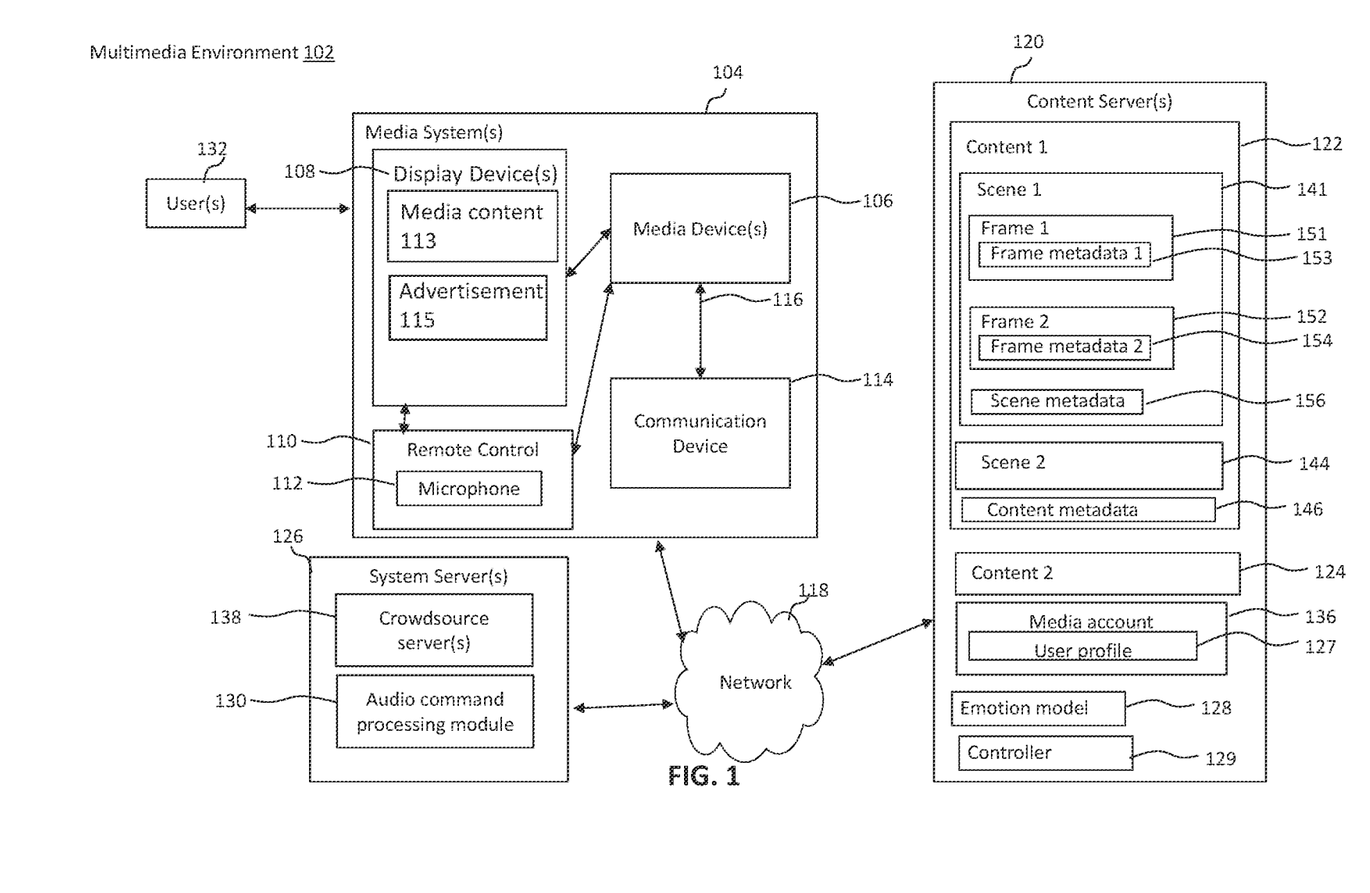
FIG. 1 illustrates a block diagram of a multimedia environment including an emotion model related to media content, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to multimedia environment 102, as will be appreciated by persons skilled in the relevant art(s) based on the teachings contained herein. An example of multimedia environment 102 shall now be described.

Multimedia Environment

FIG. 1 illustrates a block diagram of multimedia environment 102 including an emotion model related to media content, according to some embodiments. Multimedia environment 102 illustrates an example environment, architecture, ecosystem, etc., in which various embodiments of this disclosure may be implemented. However, multimedia environment 102 is provided solely for illustrative purposes, and is not limiting. Embodiments of this disclosure may be implemented and/or used in environments different from and/or in addition to multimedia environment 102 of FIG. 1, as will be appreciated by persons skilled in the relevant art(s) based on the teachings contained herein.

In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. Media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play media content, e.g., media content 113 or advertisement 115. Various users, such as user 132, may operate with media system 104 to select and consume media content or content.

Each media system 104 may include one or more media devices 106 each coupled to one or more display devices 108. Media device 106 may be referred to as a computing device as well. It is noted that terms such as "coupled," "connected to," "attached," "linked," "combined" and similar terms may refer to physical, electrical, magnetic, logical, etc., connections, unless otherwise specified herein.

Media device 106 may be a streaming media device, a streaming set-top box (STB), cable and satellite STB, a DVD or BLU-RAY device, an audio/video playback device, ca able box, and/or a digital video recording device, to name just a few examples. Display device 108 may be a monitor, a television (TV), a computer, a computer monitor, a smart phone, a tablet, a wearable (such as a watch or glasses), an appliance, an internet of things (IoT) device, and/or a projector, to name just a few examples. In some embodiments, media device 106 can be a part of, integrated with, attached to, operatively coupled to, and/or connected to its respective display device 108. Media device 106 can provide media content 113 and advertisement 115 to display device 108.

Each media device 106 may be configured to communicate with network 118 via a communication device 114. Communication device 114 may include, for example, a cable modem or satellite TV transceiver. Media device 106 may communicate with communication device 114 over a link 116, where link 116 may include wireless (such as WiFi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106, display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106, or display device 108 using cellular, Bluetooth, infrared, etc., or any combination thereof.

Multimedia environment 102 may include a plurality of content servers 120 (also called content providers, sources 120). Although only one content server 120 is shown in FIG. 1, in practice the multimedia environment 102 may include any number of content servers 120. Each content server 120 may be configured to communicate with network 118. Content server 120, media device 106, display device 108, may be collectively referred to as a media system, which may be an extension of media system 104. In some embodiments, a media system may include system server 126 as well.

Content server 120 may include one or more controller 129 that can operate an emotion model 128, and store various content, such as content 122, content 124, and other content. Emotional model 128 can include a valence, arousal, and dominance (VAD) model, or a pleasure, arousal, and dominance (PAD) model, or any other emotion model developed and accessible a person of ordinary skill in the arts.

As an example, content 122 can include a plurality of scenes, such as a scene 141 and a scene 144, and content metadata 146. Content 124 can have a similar structure as content 122. As an example, scene 141 can include a plurality of frames, such as a frame 151 and a frame 152, and scene metadata 156. Furthermore, frame 151 can further include frame metadata 153, and frame 152 can include frame metadata 154. Scene 144 can have a similar structure as scene 141. Emotion model 128 can be a model processing text input that receives an input file including frame metadata 153 related to frame 151, frame metadata 154 related to frame 152, scene metadata 156 related to scene 141, and content metadata 146 related to content 122.

Content 122 or content 124 may include any combination of music, videos, movies, TV programs, multimedia, images, still pictures, text, graphics, gaming applications, advertisements, programming content, public service content, government content, local community content, software, and/or any other content or data objects in electronic form. Content 122 or content 124 can include a media file, a movie file, a video file, an audio file, a text file, a short clip file, or an advertisement file. Content 122 or content 124 may be the source for media content 113 or advertisement 115 displayed on display device 108.

In some embodiments, metadata, such as content metadata 146, scene metadata 156, frame metadata 153, and frame metadata 154, may generally include associated or ancillary information indicating or related to writer, director, producer, composer, artist, actor, summary, chapters, production, history, year, trailers, alternate versions, related content, applications, and/or any other information pertaining or relating to content 122. Metadata, such as content metadata 146, scene metadata 156, frame metadata 153, and frame metadata 154, may also or alternatively include links to any such information pertaining or relating to content 122. In some embodiments, frame metadata 153, frame metadata 154, scene metadata 156, and content metadata 146 may include information generated by the content creators, and may also include information generated by content server 120. In some embodiments, frame metadata 153 may include color contrast, brightness, histogram of color spectrum, a number of objects, a trajectory of objects contained in frame 151, or a frame feature contained in frame 151. Scene metadata 156 related to scene 141 can include information about objects, people, places, actions, caption data text of the scene, and audio information related to scene 141. Content metadata 146 related to content 122 can include information about a genre of the content, keywords, a description, and reviews of content 122.

In some embodiments, content server 120 may manage a plurality of media accounts, e.g., media account 126. A media account may be accessible by one or more members of a household. Media account 126 may include a user profile 127, which may be related to all the members of the household. In some other embodiments, there may be a different useful profile for each member of the household associated with media account 126. User profile 127 can be related to and store information about media content 113 or advertisement 115 displayed on display device 108 by user 132 accessed through media account 126. For example, user profile 127 may store some raw data about media content 113 or advertisement 115, such as the name of a show being viewed, a time the show being viewed, and other related information. User profile 127 may further store demographic information of media account 126, and other information such as an emotion value of a user, as shown in FIG. 3B.

Multimedia environment 102 may include one or more system servers 126. System servers 126 may operate to support media device 106 from the cloud. It is noted that the structural and functional aspects of system servers 126 may wholly or partially exist in the same or different ones of system servers 126. System servers 126 and content server 120 together may be referred to as a media server system. An overall media system may include a media server system and media system 104. In some embodiments, a media system may refer to the overall media system including the media server system and media system 104.

Media devices 106 may exist in thousands or millions of media systems 104. Accordingly, media devices 106 may lend themselves to crowdsourcing embodiments and, thus, system servers 126 may include one or more crowdsource servers 128.

For example, using information received from media devices 106 in the thousands and millions of media systems 104, crowdsource server(s) 128 may identify similarities and overlaps between closed captioning requests issued by different users 132, watching a particular movie. Based on such information, crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, crowdsource server(s) 128 may operate to cause closed captioning to be automatically turned on and/or off during future streaming of the movie.

System servers 126 may also include an audio command processing module 130. As noted above, remote control 110 may include a microphone 112. Microphone 112 may receive audio data from user 132 (as well as other sources, such as display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which is then forwarded to audio command processing module 130 in system servers 126. Audio command processing module 130 may operate to process and analyze the received audio data to recognize a verbal command from user 132. Audio command processing module 130 may then forward the verbal command back to media device 106 for processing.

Figure 2:
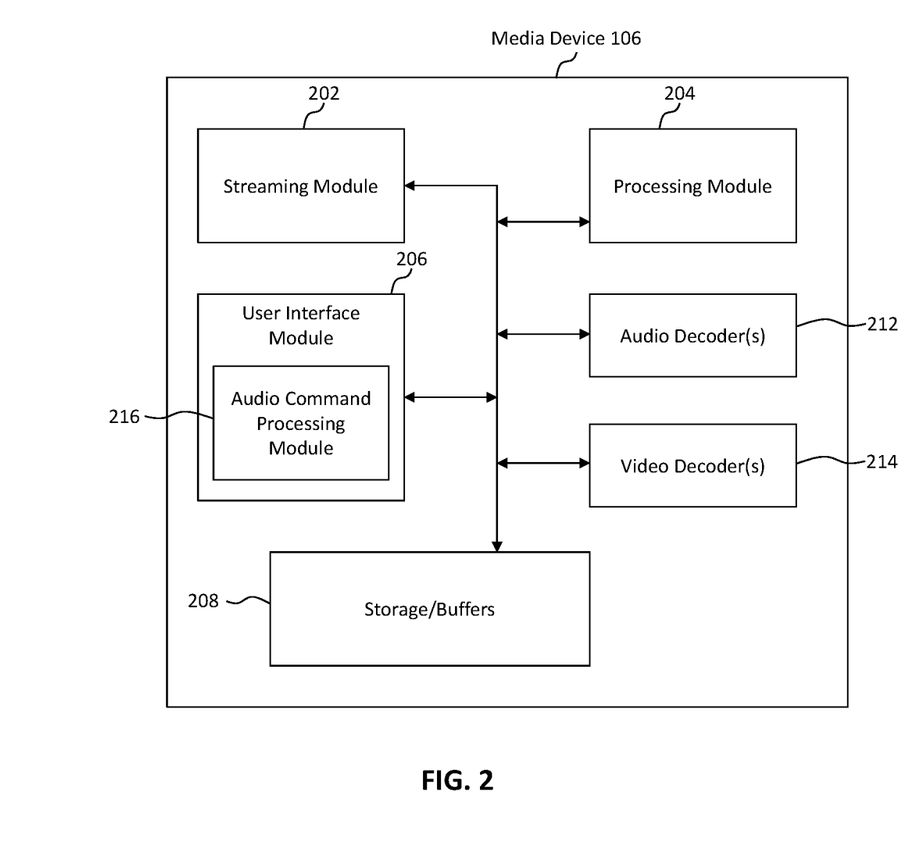
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 130 in system servers 126, or the verbal command recognized by audio command processing module 216 in media device 106).

FIG. 2 illustrates a block diagram of an example media device 106, according to some embodiments. Media device 106 may include a streaming module 202, a processing module 204, a storage/buffers 208, and a user interface module 206. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 via, for example, remote control 110. For example, user 132 may use remote control 110 to interact with user interface module 206 of media device 106 to select content, such as a movie, TV show, music, book, application, game, etc. Streaming module 202 of media device 106 may request the selected content from content server(s) 120 over network 118. Content server(s) 120 may transmit the requested content to streaming module 202. Media device 106 may transmit the received content to display device 108 for playback to user 132.

In streaming embodiments, streaming module 202 may transmit the content to display device 108 in real time or near real time as it receives such content from content server 120. In non-streaming embodiments, media device 106 may store the content received from content server 120 in storage/buffers 208 for later playback on display device 108.

Emotion Evaluation of Media Content Based on an Emotion Model.

Figure 3A:
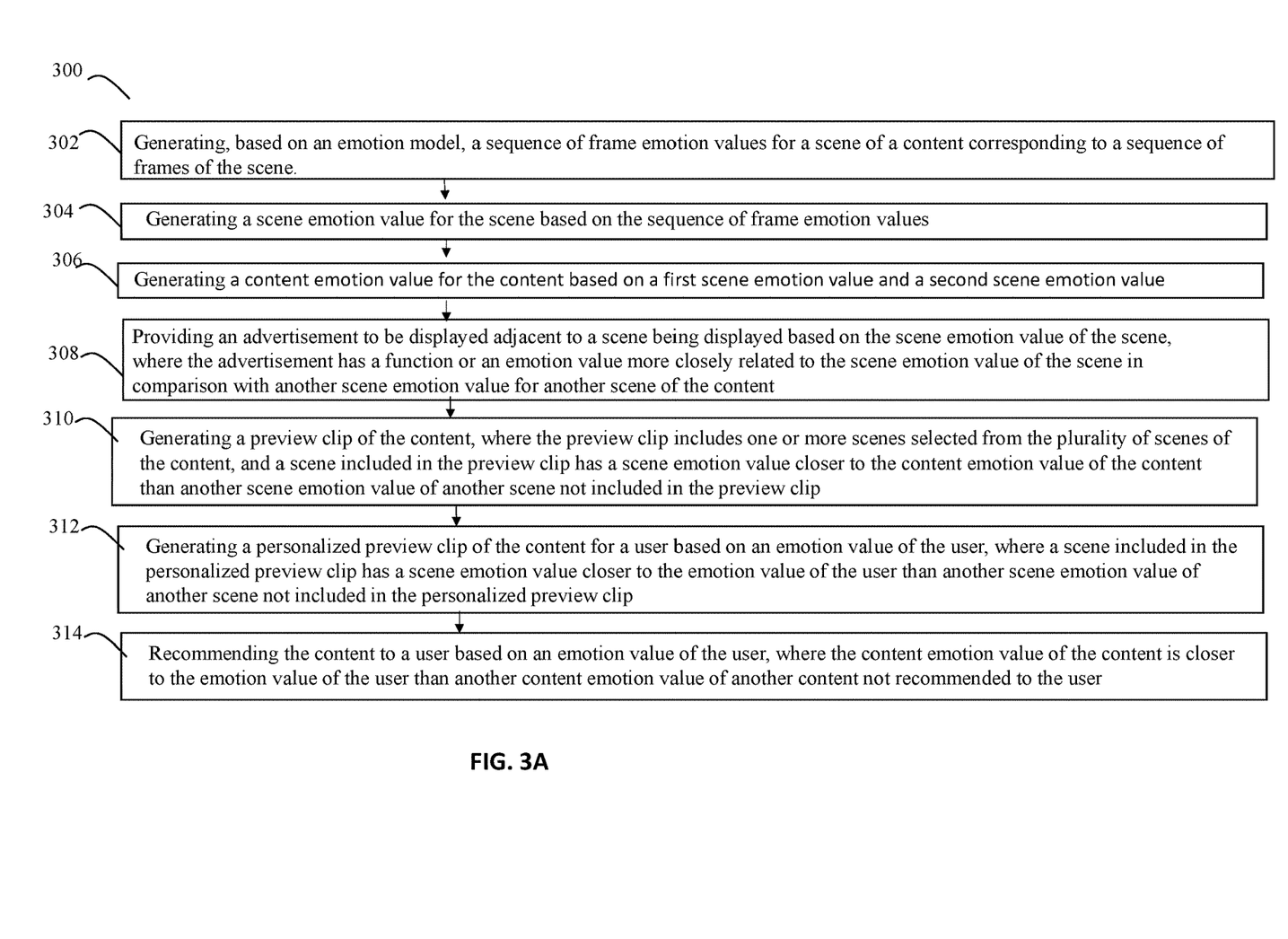
FIGS. 3A-3B illustrate an example process for generating a frame emotion value for a frame, a scene emotion value for a scene, and a content emotion value for a content based on an emotion model, according to some embodiments.
Figure 3B:
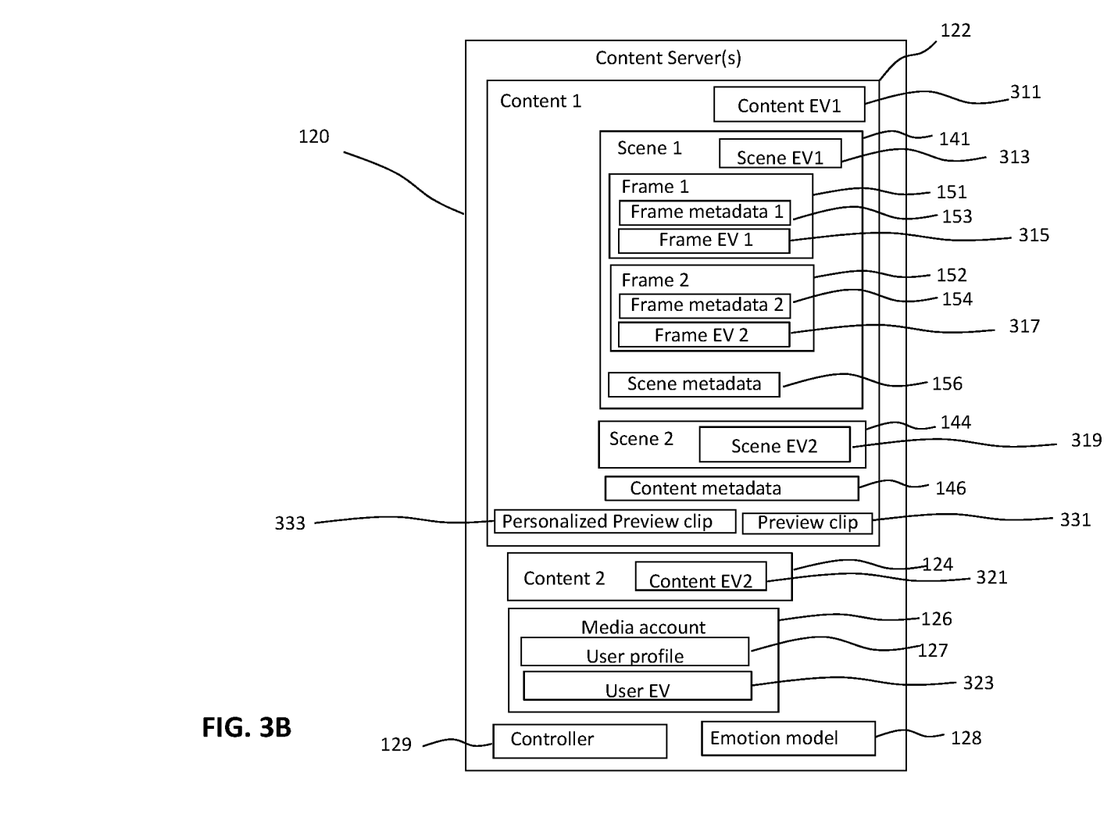

FIGS. 3A-3B illustrate an example process 300 for generating a frame emotion value for a frame, a scene emotion value for a scene, and a content emotion value for a content based on an emotion model, according to some embodiments. Processes 300 shown in FIG. 3A can be performed by processing logic that can comprise hardware (e.g., circuitry, dedicated logic, programmable logic, microcode, etc.), software (e.g., instructions executing on a processing device, such as by controller 129), or a combination thereof. It is to be appreciated that not all steps may be needed to perform the disclosure provided herein. Further, some of the steps may be performed simultaneously, or in a different order than shown in FIG. 3A, as will be understood by a person of ordinary skill in the art. FIG. 3B shows the operation results for process 300.

At 302, content server 120 may generate, based on an emotion model, a sequence of frame emotion values for a scene of a content corresponding to a sequence of frames of the scene. For example, as described for FIGS. 1 and 3B, content server 120 can generate, based on emotion model 128, a sequence of frame emotion values for scene 141 of content 122 corresponding to a sequence of frames of scene 141. For example, scene 141 can include frame 151 and frame 152. Content server 120 may generate frame emotion value 315 for frame 151, and generate frame emotion value 317 for frame 152. There can be more frames in scene 141, and for each frame of scene 141, there can be a frame emotion value generated similarly. Frame emotion value 315 can be generated based on scene metadata 156 related to scene 141, and content metadata 146 related to content 122. In addition, frame emotion value 315 is generated further based on frame metadata 153 related to frame 151, and frame emotion value 317 is generated further based on frame metadata 154 related to frame 152.

In some embodiments, when emotion model 128 is the VAD model, frame emotion value 315 can have an emotion value to be anger, which is represented as (−0.43, 0.67, 0.34) in the (valance, arousal, dominance) model. Alternatively, frame emotion value 315 can have an emotion value to be joy, which is represented as (0.76, 0.48, 0.35) in the (valance, arousal, dominance) model. In general, frame emotion value 315 can have an emotion value (x, y, z) in a three dimensional coordinate corresponding to the (valance, arousal, dominance) model.

At 304, content server 120 may generate a scene emotion value for the scene based on the sequence of frame emotion values. For example, content server 120 may generate a scene emotion value 313 for scene 141 based on the sequence of frame emotion values including frame emotion value 315 and frame emotion value 317. For example, scene 141 may have 10 frames of happy emotion value, and 3 frames of grim emotion value, therefore, scene 141 can have an emotion value of happy at 10/(10+3)=0.76, and an emotion value of grim at 3/(10+3)=0.24. As shown in the example, the emotion value of happy at 10/(10+3)=0.76 for scene 141 is derived based on a percentage of the number of frames having the emotion value happy. Other formulas can be used, such as weighted average, or any other statistics ways to calculate the scene emotion value for the scene based on the sequence of frame emotion values. Similarly, content server 120 may generate a scene emotion value 319 for scene 144 based on the sequence of frame emotion values for frames within scene 144.

At 306, content server 120 may generate a content emotion value for the content based on a first scene emotion value and a second scene emotion value. For example, content server 120 may generate a content emotion value 311 for content 122 based on the scene emotion value 313 and scene emotion value 319. Similarly, for content 124, content server 120 may generate a content emotion value 321 for content 124 based on the scene emotion values of content 124. In addition, content server 120 can save content emotion value 311, scene emotion value 313 and scene emotion value 319, frame emotion value 315 and frame emotion value 317 into a storage. As shown in above examples, frame emotion value 315 and frame emotion value 317 can be generated based on emotion model 128, such as the VAD emotion model or PAD emotion model. In addition, scene emotion value 313 and scene emotion value 319 can be generated by applying some statistical formula to a sequence or collection of frame emotion values generated by emotion model 128. Similarly, content emotion value 311 can be generated by applying some statistical formula to a sequence or collection of scene emotion values as shown. The statistical formula used to generate scene emotion value 313 or scene emotion value 319 can be different from the statistical formula used to generate content emotion value 311 or content emotion value 321.

At 308, content server 120 may provide an advertisement to be displayed adjacent to the scene being displayed based on the scene emotion value of the scene, where the advertisement has a function or an emotion value more closely related to the scene emotion value of the scene in comparison with another scene emotion value for another scene of the content. For example, content server 120 may provide advertisement 115 to be displayed adjacent to scene 141 being displayed based on scene emotion value 313 of scene 141. Advertisement 115 may be a media file, and a content by itself. Hence, advertisement 115 can have an emotion value calculated in a way similar to the way scene emotion value 313 of scene 141 is calculated. After the emotion value of advertisement 115 is calculated, embodiments herein can calculate a difference between two emotion values, such as a difference between the emotion value of advertisement 115 and scene emotion value 313 of scene 141, or a difference between the emotion value of advertisement 115 and scene emotion value 319 of scene 144. In some embodiments, scene emotion value 313 of scene 141 and scene emotion value 319 for scene 144 can be calculated based on a weighted formula where the last few frames of a scene can have a higher weight than frames at the beginning of the scene. The distance between two emotion values vectors can be calculated by any formula known to a person having the ordinary skill in the art to calculate the distance between two emotion values vectors (x1, y1, z1) and (x2, y2, z2) in a N-Dimension vector space. When the distance between the emotion value vector of advertisement 115 and scene emotion value vector 313 of scene 141, is smaller than the distance between the emotion value vector of advertisement 115 and scene emotion value vector 319 of scene 144, advertisement 115 may be displayed immediately after, or adjacent to scene 141. In some embodiments, advertisement 115 can be displayed adjacent to a scene based on the functions performed by products in advertisement 115. When advertisement 115 is displayed adjacent to scene 141, advertisement 115 has a function or an emotion value more closely related to scene emotion value 313 of scene 141 in comparison with scene emotion value 319 for scene 144. In some embodiments, advertisement 115 can be displayed beside scene 141 in a content where advertisement 115 and scene emotion value vector 313 of scene 141 are closer than rest of the scenes in the content. In some embodiments, advertisement 115 can be selected from a pool of advertisements for a content slot, which is the best advertisement from the list of advertisements to place in the content given the advertisement and content scene emotion similarity.

At 310, content server 120 may generate a preview clip of the content, where the preview clip includes one or more scenes selected from the plurality of scenes of the content, and a scene included in the preview clip has a scene emotion value closer to the content emotion value of the content than another scene emotion value of another scene not included in the preview clip. For example, content server 120 may generate a preview clip 331 of content 122. Preview clip 331 includes one or more scenes selected from the plurality of scenes of content 122, such as scene 141. For example, preview clip 331 may include scene 141, and may not include scene 144. A difference between scene emotion value 313 of scene 141 and content emotion value 311 may be smaller than a difference between scene emotion value 319 of scene 144 and content emotion value 311.

Trailers and preview clips generated based on the emotion model can say a lot about a content, which can draw potential users to consume or view the content, without giving away the twist or the ending of the content. In addition, preview clips or trailers have a viral and social aspect to it, where users tend to share and discuss about clips for content not yet released. This will drive new users to the platform.

At 312, content server 120 may generate a personalized preview clip of the content for a user based on an emotion value of the user, where a scene included in the personalized preview clip has a scene emotion value closer to the emotion value of the user than another scene emotion value of another scene not included in the personalized preview clip. For example, content server 120 may generate a personalized preview clip 333 of content 122 for user 132. Based on user profile 127 of user 132, a user emotion value 323 may be generated. User emotion value 323 may be generated based on content emotion values of previous viewed contents by user 132. Personalized preview clip 333 includes one or more scenes selected from the plurality of scenes of content 122, such as scene 141. For example, personalized preview clip 333 may include scene 141, and may not include scene 144. A difference between scene emotion value 313 of scene 141 and user emotion value 323 may be smaller than a difference between scene emotion value 319 of scene 144 and content user emotion value 323.

At 314, content server 120 may recommend the content to a user based on an emotion value of the user, where the content emotion value of the content is closer to the emotion value of the user than another content emotion value of another content not recommended to the user. For example, content server 120 may recommend content 122 to user 132 instead of content 124, when a difference between content emotion value 311 of content 122 is closer to emotion value 323 of user 132 than a difference between content emotion value 321 of content 124 and emotion value 323 of user 132.

Figure 4:
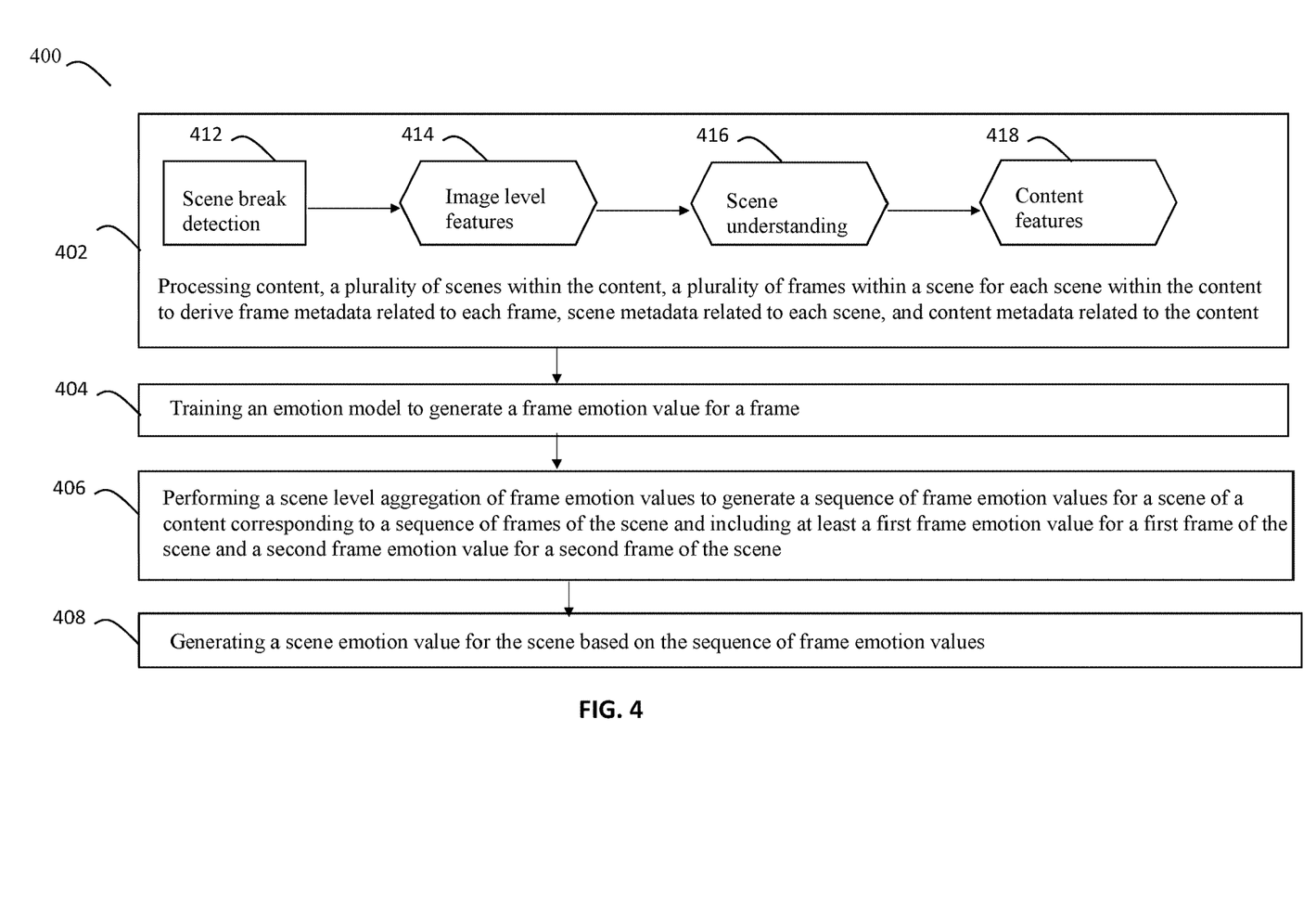
FIG. 4 illustrates another example process for generating a frame emotion value for a frame and a scene emotion value for a scene based on an emotion model, according to some embodiments.

FIG. 4 illustrates another example process 400 for generating a frame emotion value for a frame and a scene emotion value for a scene based on an emotion model, according to some embodiments.

At 402, content server 120 may process content, a plurality of scenes within the content, a plurality of frames within a scene for each scene within the content to derive frame metadata related to each frame, scene metadata related to each scene, and content metadata related to the content. For example, content server 120 may process content 122, a plurality of scenes within content 122 such as scene 141, scene 144, and other scenes, and a plurality of frames within a scene such as frame 151, frame 152, and other frames, frames of other scenes, to derive frame metadata 153 for frame 151, frame metadata 154 for frame 152, scene metadata 156 related to scene 141, a scene metadata related to scene 144, and content metadata 146 related to content 122.

There can be multiple operations performed at 402. At 412, content server 120 may detect scene breaks to identify and isolate each individual scene within content 122, such as scene 141 and scene 144. Scenes, such as scene 141 and scene 144 can be further sampled into collection of frames for further processing.

At 414, content server 120 may extract frame metadata for each frame. For example, content server 120 may extract frame metadata 153 for frame 151. Frame metadata 153 may include color contrast, brightness, histogram of color spectrum, a number of objects, a trajectory of objects contained in frame 151, or a frame level feature or a frame feature contained in frame 151. Content server 120 may apply tools such as deep neural networks trained on large scale image data to extract image embedding.

At 416, content server 120 may perform operations to gain scene understanding, and to extract scene metadata related to the scene, where the scene metadata related to the scene includes information about objects, people, places, actions, caption data text of the scene, and audio information related to the scene. For example, content server 120 may use a video understanding model to analyze the scene in terms of objects, people, places, actions, which can be provided as keywords. Content server 120 may further use caption data or text to identify and classify dialogue in the scene, and apply Term Frequency-Inverse document frequency (TF-IDF) method for N-gram to derive numerical weightage of words which reflects how important the particular word is to a document in a corpus. Content server 120 may further find unique and representative keywords, represent words and sentences in an embedding space, like using Glove embedding, BERT model for sentence embedding, or any other embedding known to one having ordinary skills in the art, and may further apply pre-trained embedding for audio information in the scenes.

At 418, content server 120 may perform operations to extract content features and to form content metadata related to the content includes information about a genre of the content, keywords, a description, and reviews of the content. For example, content metadata can include genres, keywords, niche genre descriptors, description, reviews from others, and further represent the content metadata represented in a text embedding space.

At 404, content server 120 may train an emotion model to generate a frame emotion value for a frame. For example, content server 120 may train emotion model 128 to generate a frame emotion value for frame 151 or frame 152. Labelled data may exist for keywords/mood to emotion, and emotion to VAD scores. In addition, content server 120 may use input text keywords mapped to labelled data to obtain label for the input embedding. The input embedding for the classification model may include image level, scene text and audio embedding, and content text glove embedding, with VAD labels. Emotion model 128 may output a probability for each VAD dimension for each frame in a scene, and may also output VAD scores. VAD scores can be mapped back to emotion, which can be verified by cross validation of the model and by human inputs. This approach aims to train a model that consumes image, scene, audio, text and genre content to output an emotion embedding for scenes (collection of frames) in the VAD space.

At 406, content server 120 may perform a scene level aggregation of frame emotion values to generate a sequence of frame emotion values for a scene of a content corresponding to a sequence of frames of the scene and including at least a first emotion value for a first frame of the scene and a second emotion value for a second frame of the scene. For example, content server 120 may perform a scene level aggregation of frame emotion values to generate a sequence of frame emotion values for scene 141 corresponding to a sequence of frames including at least frame emotion value 315 for frame 151 and frame emotion value 317 for frame 152. Accordingly, each frame in the scene has an emotion value/mood from the emotion model. Each scene is a sequence of frame level emotion values. Each scene can be represented by the sequence of emotion values, and the distribution of emotion values.

At 408, content server 120 may generate a scene emotion value for the scene based on the sequence of emotion values. For example, content server 120 may generate scene emotion value 313 for scene 141 based on the sequence of frame emotion values include frame emotion value 315 and frame emotion value 317.

Other operations may be further performed, such as generating content emotion value 311 based on scene emotion value 313 and scene emotion value 321. Further operations may be performed as indicated by various parts of the description herein. Content emotion values and scene emotion values may be stored in a database by content server 120. Such saved content emotion values and scene emotion values can be used to generate a preview clip of the content or a personalized preview clip of the content for a user. Emotion model 128 can be deployed online to generate emotion values for preview clips online for ad hoc clips or live clips.

Example Computer System

Figure 5:
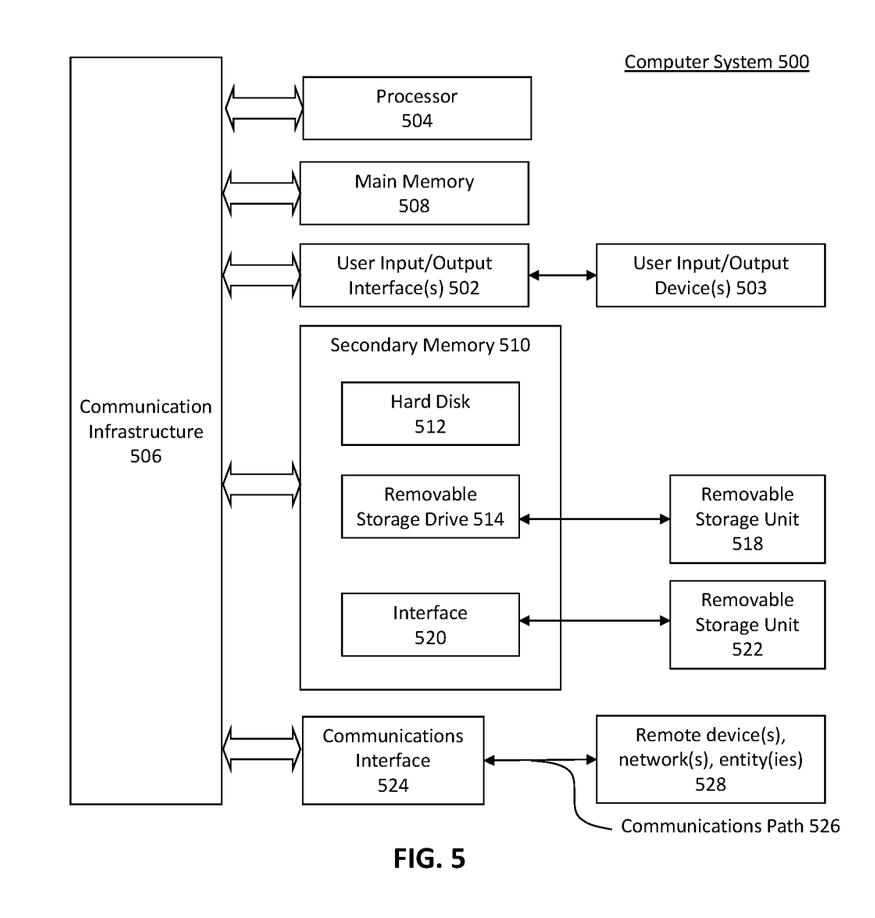
FIG. 5 illustrates an example computer system useful for implementing various embodiments.

Various embodiments may be implemented, for example, using one or more well-known computer systems, such as computer system 500 shown in FIG. 5. For example, media device 106, display device 108, content server 120, system server 126, may be implemented using combinations or sub-combinations of computer system 500 to perform various functions described herein, e.g., by process 300 or process 400. Also or alternatively, one or more computer systems 500 may be used, for example, to implement any of the embodiments discussed herein, such as content server 120 and operations performed by content server 120 as described in FIGS. 3A-3B and 4, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for emotion evaluation of content, comprising:
generating, using an emotion model, a sequence of frame emotion values for a scene of a content corresponding to a sequence of frames of the scene and including at least a first frame emotion value for a first frame of the scene and a second frame emotion value for a second frame of the scene that are generated based on scene metadata related to the scene, and content metadata related to the content, wherein the first frame emotion value is represented by a first three dimensional coordinate (x1, y1, z1) and generated further based on a first frame metadata related to the first frame, and the second frame emotion value is represented by a second three dimensional coordinate (x2, y2, z2) and generated further based on a second frame metadata related to the second frame; and
generating a scene emotion value for the scene represented by a real number based on the sequence of frame emotion values including the first three dimensional coordinate (x1, y1, z1) and the second three dimensional coordinate (x2, y2, z2).

2. The method of claim 1, wherein the content includes at least one of a media file, a movie file, a video file, an audio file, a text file, a short clip file, and an advertisement file.

3. The method of claim 1, wherein the emotion model includes a valence, arousal, and dominance (VAD) model, or a pleasure, arousal, and dominance (PAD) model.

4. The method of claim 1, further comprising:
providing an advertisement to be displayed adjacent to the scene being displayed based on the scene emotion value of the scene, wherein the advertisement has a function or an emotion value more closely related to the scene emotion value of the scene in comparison with another scene emotion value for another scene of the content.

5. The method of claim 1, wherein the scene is a first scene having a first scene emotion value, and the content comprises a plurality of scenes including at least the first scene and a second scene having a second scene emotion value, and the method further comprises:
generating a content emotion value for the content based on the first scene emotion value and the second scene emotion value; and
generating a preview clip of the content, wherein the preview clip includes one or more scenes selected from the plurality of scenes of the content, and a scene included in the preview clip has a scene emotion value closer to the content emotion value of the content than another scene emotion value of another scene not included in the preview clip.

6. The method of claim 5, further comprising:
generating a personalized preview clip of the content for a user based on an emotion value of the user, wherein a scene included in the personalized preview clip has a scene emotion value closer to the emotion value of the user than another scene emotion value of another scene not included in the personalized preview clip.

7. The method of claim 5, further comprising:
recommending the content to a user based on an emotion value of the user, wherein the content emotion value of the content is closer to the emotion value of the user than another content emotion value of another content not recommended to the user.

8. The method of claim 1, wherein the emotion model is a model processing text input that receives an input file including the first frame metadata related to the first frame, the second frame metadata related to the second frame, the scene metadata related to the scene, and the content metadata related to the content.

9. The method of claim 1, wherein the first frame metadata includes color contrast, brightness, histogram of color spectrum, a number of objects, a trajectory of objects contained in the first frame, or a frame feature contained in the first frame.

10. The method of claim 1, wherein the scene metadata related to the scene includes information about objects, people, places, actions, caption data text of the scene, and audio information related to the scene.

11. The method of claim 1, wherein the content metadata related to the content includes information about a genre of the content, keywords, a description, and reviews of the content.

12. A system, comprising:
at least one controller configured to:
generate, based on an emotion model, a sequence of frame emotion values for a scene of a content corresponding to a sequence of frames of the scene and including at least a first frame emotion value for a first frame of the scene and a second frame emotion value for a second frame of the scene that are generated based on scene metadata related to the scene, and content metadata related to the content, wherein the first frame emotion value is represented by a first three dimensional coordinate (x1, y1, z1) and generated further based on a first frame metadata of the first frame, and the second frame emotion value is represented by a second three dimensional coordinate (x2, y2, z2) and generated further based on a second frame metadata of the second frame; and
generate a scene emotion value for the scene represented by a real number based on the sequence of frame emotion values including the first three dimensional coordinate (x1, y1, z1) and the second three dimensional coordinate (x2, y2, z2).

13. The system of claim 12, wherein the at least one controller is further configured to:
provide an advertisement to be displayed adjacent to the scene being displayed based on the scene emotion value of the scene, wherein the advertisement has a function or an emotion value more closely related to the scene emotion value of the scene in comparison with another scene emotion value for another scene of the content.

14. The system of claim 12, wherein the scene is a first scene with a first scene emotion value, and the content comprises a plurality of scenes including at least the first scene and a second scene having a second scene emotion value, and the at least one controller is further configured to:
generate a content emotion value for the content based on the first scene emotion value and the second scene emotion value; and
generate a preview clip of the content, wherein the preview clip includes one or more scenes selected from the plurality of scenes of the content, and a scene included in the preview clip has a scene emotion value closer to the content emotion value of the content than another scene emotion value of another scene not included in the preview clip.

15. The system of claim 14, wherein the at least one controller is further configured to:
generate a personalized preview clip of the content for a user based on an emotion value of the user, wherein a scene included in the personalized preview clip has a scene emotion value closer to the emotion value of the user than another scene emotion value of another scene not included in the personalized preview clip.

16. The system of claim 14, wherein the at least one controller is further configured to:
recommend the content to a user based on an emotion value of the user, wherein the content emotion value of the content is closer to the emotion value of the user than another content emotion value of another content not recommended to the user.

17. A non-transitory computer-readable medium having instructions stored thereon that, when executed by at least one computing device, cause the computing device to perform operations comprising:
generating, based on an emotion model, a sequence of frame emotion values for a scene of a content corresponding to a sequence of frames of the scene and including at least a first frame emotion value for a first frame of the scene and a second frame emotion value for a second frame of the scene that are generated based on a scene metadata related to the scene, and content metadata related to the content, wherein the first frame emotion value is represented by a first three dimensional coordinate (x1, y1, z1) and generated further based on a first frame metadata of the first frame, and the second frame emotion value is represented by a second three dimensional coordinate (x2, y2, z2) and generated further based on a second frame metadata of the second frame; and
generating a scene emotion value for the scene represented by a real number based on the sequence of emotion values including the first three dimensional coordinate (x1, y1, z1) and the second three dimensional coordinate (x2, y2, z2).

18. The non-transitory computer-readable medium of claim 17, wherein the content includes at least one of a media file, a movie file, a video file, an audio file, a text file, a short clip file, and an advertisement file.

19. The non-transitory computer-readable medium of claim 17, wherein the emotion model includes a valence, arousal, and dominance (VAD) model, or a pleasure, arousal, and dominance (PAD) model.

20. The non-transitory computer-readable medium of claim 17, wherein the first frame metadata includes color contrast, brightness, histogram of color spectrum, a number of objects, a trajectory of objects contained in the first frame;
the scene metadata related to the scene includes information about objects, people, places, actions, caption data text of the scene, and audio information related to the scene; and
the content metadata related to the content includes information about a genre of the content, keywords, a description, and reviews of the content.

* * * * *